3,256,215
POLYURETHANE FOAM CROSS-LINKED WITH A DIPHENYL ETHER POLYOL AND PROCESS FOR MAKING SAME
James D. Doedens, Midland, and Earl H. Rosenbrock, Auburn, Mich., assignors to The Dow Chemical Company, Midland, Mich., a corporation of Delaware
No Drawing. Filed Oct. 10, 1962, Ser. No. 229,731
9 Claims. (Cl. 260—2.5)

This invention relates to polyurethane foams containing in the polymeric structure aromatic ether moieties and to a process for making such polymers. More particularly this invention relates to polyurethane foams having improved properties obtained by using as a cross-linking agent a polyol derived from an aromatic ether.

Polyurethane foams are well-known materials of commerce. Through variations in formulation and foaming techniques, the properties and characteristics of the polyurethane foam may be varied to produce soft flexible foams suitable for cushioning or light-weight rigid foams suitable for insulation and other construction purposes. Although current polyurethane foams possess many desirable properties and are widely used, adequate dimensional stability is a continuing problem. Under conditions of high humidity, this problem is even more pronounced. The insulating value of a rigid polyurethane foam can be destroyed by moisture-induced deterioration through loss of structural integrity and shrinkage from the enclosing surfaces. Under conditions of normal use, flexible foams may also gradually lose their original fabricated form, in some cases to the extent that they become unsuitable for further use.

It is an object of the present invention to provide polyurethane foams having excellent dimensional stability and unusual resistance to distortion under high humidity. Another object is to provide a process for making polyurethane foams having the above properties. Further objects will appear from the detailed description of this invention which follows.

In accord with this invention, the above objects are achieved by using as a cross-linking agent an aromatic polyol derived from diphenyl ether, containing from 5 to 20 weight percent OH and having the general structure:

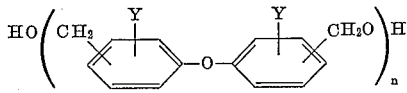

wherein Y is selected from the group consisting of —H and —CH$_2$OH and n is an integer from 1 to 3. The introduction of the hydrophobic aromatic nucleus in the urethane structure in this manner has been found to improve markedly the properties of the resulting foam, particularly its moisture resistance.

Two general methods for preparing polyurethane foams are known in the art. In the "prepolymer" method, a polyol is treated with a sufficient amount of an organic polyisocyanate to produce a liquid prepolymer containing an appreciable quantity of unreacted isocyanate groups. Subsequently the "prepolymer" is treated with a catalyst and water or a blowing agent to complete the polymerization and give the desired foam. More recently, technology has advanced to where it is possible, using carefully balanced formulations and rapid, efficient mixing, to blend all the ingredients at once and to achieve essentially simultaneously the build up of a polymeric material and the formation of the desired cellular foam structure. While either method may be used to produce polyurethane foams within the teaching of the present invention, the "one-shot" method is preferred.

The basic urethane reactants are an organic polyisocyanate and one or more polyhydroxy compounds which serve to extend and cross-link the polymer chain. Usually a catalyst such as a tertiary amine or dialkyl tin salt is required to control the rate and course of the polymerization reaction. In preparing foams a blowing agent is required. Generally in "one-shot" systems a liquid blowing agent which vaporizes at or below the temperature of the polymerizing mass is used. Also, a surfactant or dispersant to control the cell structure of the foam is required.

While many organic polyisocyanates, such as hexamethylene diisocyanate, naphthalene 1,5-diisocyanate, m-phenylene diisocyanate, or tolylene diisocyanate, may be used for the purpose of making polyurethane foams, tolylene diisocyanate (TDI) is generally preferred. In the "one-shot" process the polyisocyanate and the polyhydroxy compounds are usually reacted in approximately equivalent (stoichiometric) portions, the foam being formed by the release of an incorporated blowing agent. The polyhydroxy cross-linking agent used in preparation of conventional rigid polyurethane foams is generally a liquid polyol having an average of at least 2.2 —OH groups/molecule and containing from 5 to 20 weight percent OH. Particularly suitable are the polyglycols obtained by treating sucrose, glycerine or a mixture thereof with propylene oxide.

The formation of a foam is achieved by release within the polymerization mass of a gaseous blowing agent such as carbon dioxide generated by the action of water with excess isocyanates or by the vaporization of a liquid having a boiling point below that generated by the exothermic polymerization reaction such as butane, pentane, dichlorofluoromethane, and the like. Particularly desirable are fluorocarbons such as fluorotrichloromethane, difluorodichloromethane, fluorodichloromethane, and 1,1-dichloro-1-fluoroethane. The amount of blowing agent used will vary with the density desired in the foaming product.

Numerous catalysts to control or accelerate the cross-linking and foaming reactions are known to the art. Bases such as sodium hydroxide, amino alcohols or tertiary amines are often used, but particularly suitable are the organo tin compounds characterized by at least one direct carbon to tin valence bond. Advantageously, in the process described herein, organo tin compounds and particularly dialkyl tin esters such as dibutyl tin dilaurate or dibutyl tin di-2-ethyl hexoate are employed.

To facilitate mixing of the reactants and to control the cellular foam structure, it is customary to add minor amounts of a surface-active or wetting agent. Among the materials suitable for this use are sorbitol esters of fatty acids, polyalcohol carboxylic acid esters, higher alkyl sulfonates, silicone fluids, polyoxyethylated adducts of fatty acids, etc. Particularly suitable are liquid dimethyl siloxane polymers. Other ingredients such as stabilizers, fillers, dyes and thickeners may be employed in small amounts as required to achieve desired properties in the finished foam.

The foam products of this invention can readily be prepared to have in addition to the characteristics already mentioned, densities advantageously within the range of about 1.0 to 25 pounds per cubic foot. Within this range, densities in the order of 1.5 to 15 pounds per cubic foot are generally preferred for rigid structural foams.

In the practice of the invention described herein, an aromatic polyol as described above is employed as a cross-linking and chain-extending agent in the polyurethane formulation. These aromatic polyols are obtained by the hydrolysis of halomethyldiphenyl ethers. The starting halomethyldiphenyl ethers are prepared most conveniently by conventional chloromethylation. Depending particularly upon on the amount of halomethylating agent employed, the crude reaction product will consist largely of mono- or polyhalomethyldiphenyl ethers. While the exact composition will vary with the chloromethylation conditions, the crude mixture containing about 26 weight percent chlorine has been found to consist predominantly of 2,4'- and 4,4'-dichloromethyldiphenyl ether with small amounts of 2- and 4-monochloromethyl ether plus some tri- and tetra-chloromethyldiphenyl ethers. Although individual halomethyldiphenyl ethers can be isolated, it is often preferable to use the crude reaction mixture.

Particularly advantageous for the present invention is the hydrolysis product of a crude chloromethyldiphenyl ether containing about 20 to 34 weight percent chlorine, i.e., an average from about 1.3 to 3.0 —$CH_2Cl$ groups per diphenyl ether moiety. The hydrolysis is preferably carried out by reacting the chloromethyldiphenyl ether first with acetic acid and sodium acetate and then hydrolyzing the crude ester with excess caustic.

In general, the composition of the hydrolysis product will be similar to that of the initial chloromethyldiphenyl ether. However, in some cases the crude hydrolysis product also contains low molecular weight condensation products. For example, a crude chloromethyldiphenyl ether containing 32.0 weight percent chlorine (2.8 —$CH_2Cl$/diphenyl ether moiety) on hydrolysis gave a product containing only 16.3 weight percent OH (2.35 —$CH_2OH$/diphenyl ether moiety). Based on the OH content, this hydrolysis product has an average chain length of 1.3 diphenyl ether groups. Further evidence for the presence of low molecular weight polymers of diphenyl ether linked by —$CH_2OCH_2$— groups was provided by the total oxygen content as determined by neutron activation analysis. Since the total OH content is a controlling factor in the present invention, the presence of these low molecular weight condensation products in the aromatic polyol is not detrimental.

The aromatic polyols suitable for use in the present invention are further characterized as containing from 5 to 20 weight percent OH and an average of from 1 to 3 —$CH_2OH$ groups/diphenyl ether moiety. However, it is preferable to use a product having about 10 to 17 weight percent OH with an average of from 1.3 to 2.5 —$CH_2OH$ groups/diphenyl ether moiety. Pure compounds such as 4,4'-dihydroxymethyldiphenyl ether, are usable in the process of this invention; but it is often preferable to use a crude hydrolysis mixture having a composition within the above limitations. For example, while the 4,4'-dihydroxydiphenyl ether is a solid having a melting point of 132–134° C., the crude hydrolysis product is often a viscous liquid which solidifies only after long standing at room temperature. Obviously such a liquid product is much more easily handled in urethane formulations.

Of critical importance during the foaming operation is the viscosity of the polymerization mass. With a proper viscosity the blowing gas is held within the reaction mixture to give the desired cellular structure. If the viscosity is too low, the gas escapes from the polymerization mass; if it is too high, the proper blowing is not achieved. As a major ingredient of urethane formulations the physical properties and particularly the viscosity of the cross-linking agent are therefore of particular concern. For proper mixing, handling, and foaming with conventional "one-shot" urethane foam equipment, it has been found that the viscosity of the cross-linking agent should be in the range from about $5 \times 10^2$ to $2 \times 10^6$ cps. at 70° C.

Since the aromatic polyols described herein are generally viscous liquids or waxy solids at 70° F., it is often necessary to employ a diluent to achieve the desired consistency and viscosity. For this purpose conventional polyether polyol cross-linking agents, such as 1,2,3-tris(2-hydroxypropyl) glycerol, octakis(2-hydroxypropyl) sucrose, N,N,N',N'-tetrakis(2-hydroxypropyl) ethylenediamine, and similar derivatives of sorbitol, pentaerythritol, etc., are satisfactory. Particularly suitable is the propylene oxide derivative of a mixture of glycerol and sucrose described more fully by Bressler and Ward in U.S. Patent 2,990,376. At times a poly(oxypropylene) glycol is also added as a further diluent. Polyols suitable for use as diluents in the compositions described herein are further characterized by having at least 2 —OH groups/molecule and containing from 5 to 20 weight percent —OH.

It is necessary to use sufficient diluent so that the viscosity of the final mixed cross-linking agent is within the range from about $5 \times 10^2$ to $2 \times 10^6$ cps. at 70° F. Since the viscosity of the aromatic polyol usually increases with increasing —OH content, a greater amount of diluent is generally required as the —OH content increases.

To obtain the best polyurethane foam properties in terms of humidity resistance, it is desirable to use at least 50 mole percent and preferably up to 80 mole percent or more of the aromatic polyol in the cross-linking agent based on total OH content. Although it is difficult to obtain an aromatic polyol mixture having a suitable viscosity without a diluent, the foam prepared from such a mixture has a high humidity resistance. Beneficial properties are also obtained using as little as 5 mole percent of the aromatic polyol. In addition to the improved dimensional stability under conditions of high humidity, the urethane foams prepared with the aromatic polyol cross-linking agents described herein are tough and have a fine, uniform cell structure.

To describe the present invention more fully but without limiting it thereto, the following examples are given by way of illustration. All parts and percentages are by weight unless otherwise specified.

EXAMPLE 1.—HYDROLYSIS OF CHLOROMETHYLDIPHENYL ETHER

To a stirred mixture of 3,000 parts of chloromethyldiphenyl ether and 2,430 parts of acetic acid was added over a period of one hour a solution of 836 parts of sodium hydroxide in 800 parts of water. During the addition the reaction temperature rose from 25 to 110° C. Then water and excess acetic acid were distilled off to a pot temperature of 140° C. at 60 mm. Hg. The mixture was then cooled and diluted with 3,000 parts of water. Finally, 1,270 parts of 50 percent sodium hydroxide solution were added at a rate such that the temperature remained at about 100° C. After refluxing for another hour, the reaction mixture was cooled, the organic phase separated, washed with water until free of chloride ion, and dried by heating to 125° C. at 20 mm. Hg.

The crude hydrolysis product was further purified by dissolving in 2.5 volumes of methyl ethyl ketone and neutralizing with hydrochloric acid to a pH of 6.8. After washing twice with water, the product was redried by distillation to a pot temperature of 120° C. at 20 mm. Hg.

The product composition of the initial chloromethyldiphenyl ether and the properties of the resulting aromatic polyol (AP) from several runs are given in Table 1.

Table 1.—*Hydrolysis of chloromethyldiphenyl ether*

| Aromatic Polyol | AP-1 | AP-2 | AP-3 | AP-4 | AP-5 |
|---|---|---|---|---|---|
| Chloromethyldiphenyl ether: | | | | | |
| Wt. percent Cl | 27.7 | 25.2 | 26.6 | 32.0 | 31.7 |
| —CH$_2$Cl/diphenyl ether | 2.15 | 1.85 | 2.0 | 2.8 | 2.7 |
| Composition:[a] | | | | | |
| 2-monochloromethyl | 0.5 | 0.3 | | 0 | <0.1 |
| 4-monochloromethyl | 4.7 | 2.4 | | 0 | 0.6 |
| 2,4'-dichloromethyl | 35.4 | 17.7 | | 1.9 | 4.1 |
| 4,4'-dichloromethyl | 37.7 | 68.5 | 100 | 8.6 | 19.3 |
| Trichloromethyl | 21.1 | 10.5 | | 89 | 75.8 |
| Tetrachloromethyl | 0.5–1.0 | 0.5 | | <1.0 | <1.0 |
| Product: | | | | | |
| Wt. percent OH | 10.6 | 14.0 | 14.8 | 16.3 | 15.9 |
| —CH$_2$OH/diphenyl ether | 1.3 | 1.85 | 2.0 | 2.35 | 2.1 |
| F.P., °C | 61–63 | 110 | 132–134 | <60 | <60 |

[a] Mole percent.

EXAMPLE 2.—RIGID POLYURETHANE FOAMS

Materials (aromatic polyols from Example 1):

Polyol S-1, a liquid condensation product of sucrose and propylene oxide; 12.5 wt. percent OH.

Polyol S-2, a liquid condensation product of sucrose and propylene oxide; 10.6 wt. percent OH.

Polyol SG-1, a liquid condensation product of sucrose and glycerine with propylene oxide; 18.5 wt. percent OH.

Polyol SG-2, a liquid condensation product of sucrose and glycerine with propylene oxide; 14.8 wt. percent OH.

Tolylene diisocyanate (TDI), mixed isomers.

Fluorotrichloromethane, B.P., 23.8° C.

Dow Corning Fluid 199, a silicone-glycol copolymer having a viscosity of 3,000 cs./25° C., a density of 1.02/25° C., and a flash point of 350° F.

Dibutyl tin di-2-ethylhexoate, a urethane catalyst.

Triethylenediamine.

Formulation I:

27.3 parts (0.17 mole OH) AP-1 (10.6% OH),
23.2 parts (0.17 mole OH) polyol S-1 (12.5/ OH),
31.2 parts (0.36 mole NCO) TDI,
13.0 parts fluorotrichloromethane,
0.3 part Dow Corning Fluid 199, and
0.1 part dibutyl tin di-2-ethylhexoate.

All of the above reactants except TDI were mixed until solution was achieved. Then the solution was added to the TDI in a foam cup and thoroughly mixed with a high speed agitator. When the reaction was complete, the polyurethane foam was post cured for 15 minutes in an oven at 70° C. The resulting rigid polyurethane foam had a uniform cell structure and was non-friable. The density of the foam was 1.85 lbs./ft.$^3$ and it contained 94.6% closed cells.

Formulation II:

41.4 parts (0.36 mole OH) polyol SG-2 (14.8/ OH),
33.0 parts (0.38 mole NCO) TDI,
13.7 parts fluorotrichloromethane,
0.5 part Dow Corning Fluid 199, and
0.2 part triethylenediamine.

This is a typical rigid "one-shot" polyurethane foam formulation using a conventional polyether polyol cross-linking agent. The properties of the foam prepared with this formulation by the method described for Formulation I are very similar to those of the aromatic polyol based foam except in humidity resistance.

EXAMPLE 3.—HUMIDITY RESISTANCE

Samples of the foams described in Example 2 were cut into 1" x 1" x 3⅞" pieces having a volume of approximately 66 ml. The pieces were placed in a humidity cabinet at 70° C. and 100% relative humidity and their stability determined by periodic measurement of the foam volume during a month's exposure in the humidity cabinet. Typical results of these tests are given in Table 2.

Table 2

[Humidity test—70° C., 100% relative humidity]

| Exposure Time, Days | Percent Increase in Volume | | | | | |
|---|---|---|---|---|---|---|
| | Formulation I | | | Formulation II | | |
| | A | B | C | D | E | F |
| 1 | 3 | 1.5 | 3 | 4 | 14 | 14 |
| 3 | | | | 11 | 21 | 18 |
| 6 | 9 | 7.5 | 7.5 | | | |
| 13 | 10.5 | 9 | 10.5 | 17 | 32 | 26 |
| 20 | 12 | 10.5 | 10.5 | | | |
| 28 | 12 | 10.5 | 10.5 | 28 | 36 | 32 |

The superior humidity resistance of the polyurethane foam prepared with an aromatic polyol (Formulation I) is clearly shown. Rigid polyurethane foams prepared using other conventional polyether polyol in formulations similar to Formulation II also generally show volume increases of from 20 to 30% or more in this humidity resistance test.

EXAMPLE 4.—OTHER POLYOL MIXTURES

Using Formulation I of Example 2 with appropriate adjustments in the total amount of cross-linking agent employed, rigid polyurethane foams were made using the following cross-linking mixtures.

Series A: 30–70 mole percent AP-1 (10.6% OH) + 70–30 mole percent polyol S-1 (12.5% OH);

Series B: 30–70 mole percent AP-1 (10.6% OH) + 70–30 mole percent polyol SG-1 (18.5% OH);

Series C: 50 mole percent AP-2 (14.0% OH) + 50 mole percent polyol SG-1 (18.5% OH); and Series D: 30 mole percent AP-5 (15.9% OH) + 70 mole percent polyol S-2 (10.6% OH).

The foams in all cases were very tough and had excellent cell structure and improved humidity resistance. However, attempts to prepare polyurethane foams from mixtures of 50 mole percent polyol S-1 (12.5% OH) with 50 mole percent of either AP-3 (14.6% OH) or AP-4 (16.3% OH) were unsuccessful since the viscosity of the mixture was too high for satisfactory mixing with the balance of the formulation.

We claim:

1. As a composition of matter, a polyurethane foam cross-linked with at least 5 mole percent of a diphenyl ether polyol based on total polyol OH content required, said diphenyl ether polyol containing from 5 to 20 weight percent OH and having the general structure:

$$HO \left( \underset{CH_2}{\overset{Y}{\bigcirc}} -O- \underset{CH_2O}{\overset{Y}{\bigcirc}} \right)_n H$$

wherein Y is selected from the group consisting of —H and —CH$_2$OH and $n$ is an integer from 1 to 3.

2. The polyurethane foam of claim 1 wherein the diphenyl ether polyol contains from 10 to 17 weight percent OH.

3. The polyurethane foam of claim 1 cross-linked with a mixture having a viscosity in the range from about $5 \times 10^2$ to $2 \times 10^6$ cps. at 70° F. and consisting essentially of a diphenyl ether polyol and a polyol having at least 2 —OH groups/molecule and containing from 5 to 20 weight percent OH.

4. A polyurethane foam cross-linked with a mixture consisting essentially of:

(A) At least 5 mole percent based on total polyol OH content of a diphenyl ether polyol containing from 5 to 20 weight per cent OH and having the general structure:

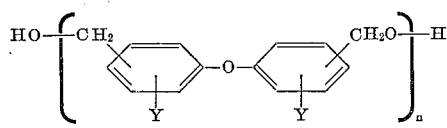

wherein
Y is selected from the group consisting of —H and —CH$_2$OH, and
$n$ is an integer from 1 to 3; and (B) A second polyol having at least 2 —OH groups/molecule and from 5 to 20 weight percent OH selected from the group consisting of the propylene oxide adducts of sucrose, glycerine, and sucrose-glycerine mixtures, said mixture of A and B having a viscosity in the range from about $5 \times 10^2$ to $2 \times 10^6$ cps. at 70° F.

5. The polyurethane foam of claim 4 cross-linked with a mixture consisting essentially of from 5 to 80 mole percent of a diphenyl ether polyol containing from 10 to 14.5 weight percent OH, and from 95 to 20 mole percent of the polyol.

6. The polyurethane foam of claim 4 cross-linked with a mixture consisting essentially of from 5 to 40 mole percent of a diphenyl ether polyol containing from 10 to 17 weight percent OH, and from 95 to 60 mole percent of polyol.

7. A method for preparing a polyurethane foam from a diphenyl ether polyol containing from 5 to 20 weight percent OH and having the general structure:

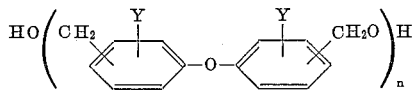

wherein Y is selected from the group consisting of —H and —CH$_2$OH and $n$ is an integer from 1 to 3, which comprises mixing said diphenyl ether polyol with a sufficient amount of a polyol having at least 2 —OH groups/molecule and containing from 5 to 20 weight percent OH to give a mixture having a viscosity in the range from about $5 \times 10^2$ to $2 \times 10^6$ cps. at 70° F.; reacting said polyol mixture with an essentially equivalent amount of an organic polyisocyanate in the presence of a catalyst and a low-boiling fluorocarbon; and permitting the temperature of the reaction mixture to rise above the boiling point of said fluorocarbon whereby a polyurethane foam is produced.

8. The method of claim 7 wherein the organic polyisocyanate is tolylene diisocyanate.

9. The method of claim 7 wherein the fluorocarbon is fluorotrichloromethane.

References Cited by the Examiner
UNITED STATES PATENTS

| | | | |
|---|---|---|---|
| 3,072,582 | 1/1963 | Frost | 260—2.5 |
| 3,075,927 | 1/1963 | Lanham | 260—2.5 |
| 3,100,796 | 8/1963 | Trapp et al. | 260—613 |
| 3,164,565 | 1/1965 | Calamari | 260—77.5 XR |

LEON J. BERCOVITZ, *Primary Examiner.*

D. E. CZAJA, *Assistant Examiner.*